United States Patent [19]

Dickerson

[11] 4,243,339

[45] Jan. 6, 1981

[54] ADJUSTABLE KINGPIN ASSEMBLY

[75] Inventor: Carroll D. Dickerson, New Hudson, Mich.

[73] Assignee: Ford Motor Company, Dearborn, Mich.

[21] Appl. No.: 28,626

[22] Filed: Apr. 9, 1979

[51] Int. Cl.³ .............................................. B62D 17/00
[52] U.S. Cl. .................................... 403/4; 403/157; 280/661
[58] Field of Search .................. 403/3, 4, 158, 159, 403/161, 162, 163, 367, 371, DIG. 7, 157; 280/661

[56] References Cited

U.S. PATENT DOCUMENTS

| | | | |
|---|---|---|---|
| 2,096,116 | 10/1937 | Leighton | 280/661 |
| 2,405,458 | 8/1946 | Slack et al. | 403/122 X |
| 2,544,331 | 3/1951 | Kogstrom | 403/47 X |
| 2,900,196 | 8/1959 | Nieuke | 403/75 X |
| 3,034,810 | 5/1962 | Primeau | 403/56 |
| 3,124,370 | 3/1964 | Traugott | 403/161 X |
| 3,163,441 | 12/1964 | Traugott | 280/661 |
| 3,342,507 | 9/1967 | Koch et al. | 280/661 X |
| 3,563,564 | 2/1971 | Bartkowiak | 403/126 |
| 3,866,938 | 2/1975 | Boyd | 403/4 |
| 4,026,578 | 5/1977 | Mattson | 280/661 |

Primary Examiner—Andrew V. Kundrat
Attorney, Agent, or Firm—Steven L. Permut; Clifford L. Sadler

[57] ABSTRACT

A kingpin assembly provided with a sleeve with an angled aperture therethrough. The sleeve is rotatable within an aperture at the end of an axle. The angled aperture is sized to receive a kingpin. The ends of the kingpin are mounted to a spindle. Rotation of the sleeve angles the kingpin from its vertical normal position to provide positive or negative camber to the mounted spindle and mounted wheel thereon.

10 Claims, 6 Drawing Figures

U.S. Patent   Jan. 6, 1981   4,243,339
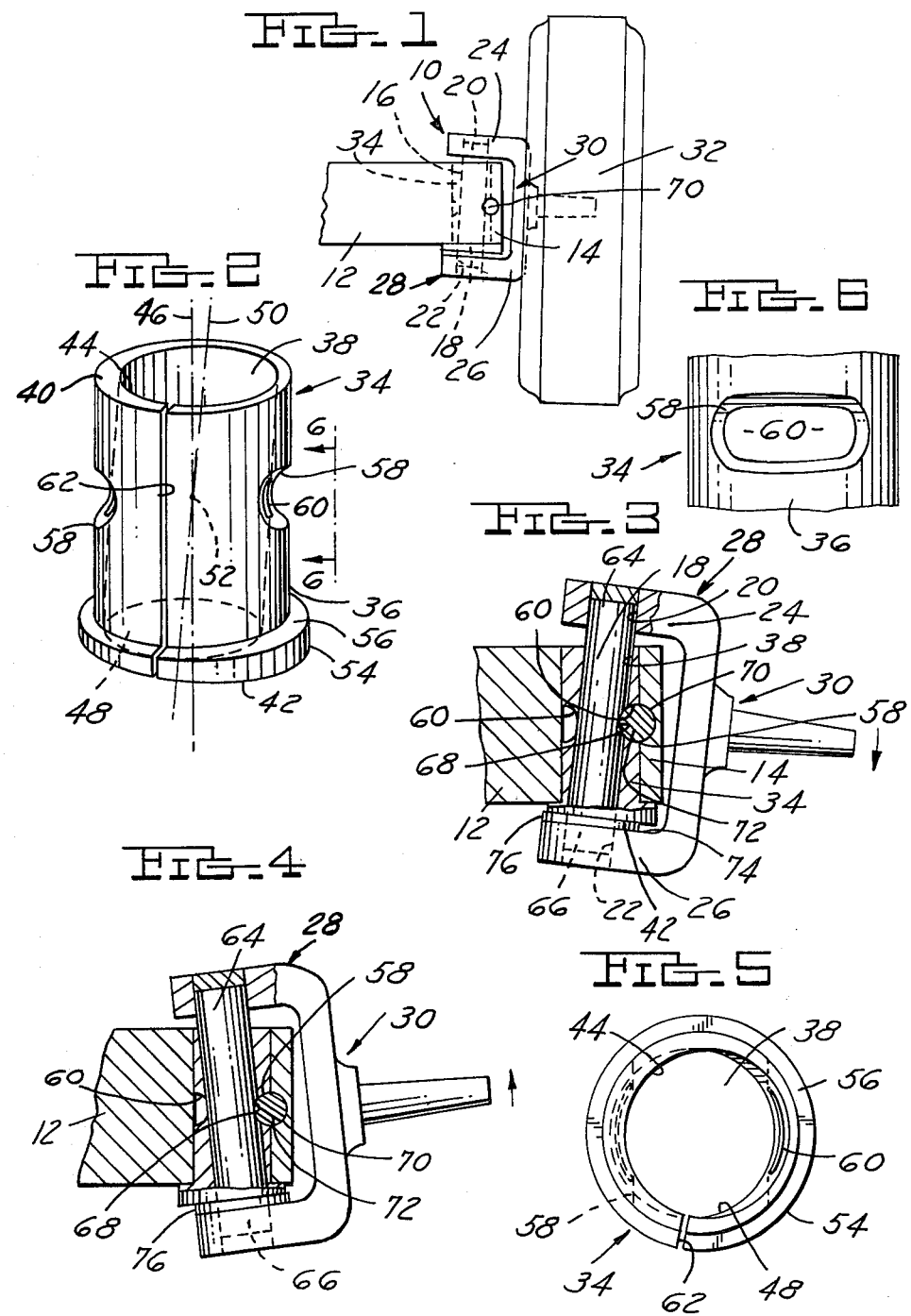

ADJUSTABLE KINGPIN ASSEMBLY

BACKGROUND OF THE INVENTION

1. Field of the Invention

This invention relates to a kingpin assembly and more particularly, an adjustable kingpin assembly which controls the camber or castor of a wheel assembly mounted to the kingpin assembly.

2. Description of the Prior Art

Kingpin assemblies are conventionally manufactured to provide a fixed camber and castor to a wheel mounted thereon. The amount of camber is predetermined and the kingpin assembly is manufactured to this predetermined camber. Once the vehicle is manufactured with the appropriate kingpin assembly, the camber and castor of the wheel is fixed and cannot be adjusted.

Due to manufacturing tolerances and changes of condition of the vehicle, camber and castor adjustment is desired to provide individualized handling characteristics of the motor vehicle.

The plurality of camber and castor adjustors have been available for other types of steering wheel assemblies such as the McPherson strut assemblies or ball joint assemblies. U.S. Pat. No. 4,026,578 issued to Mattson on May 31, 1977 discloses a sleeve with an eccentrically displaced hole for adjustment of the McPherson strut assembly. Such sleeves with eccentrically displaced holes with an axis parallel with the central axis of the sleeve have also been used in adjusting the camber of a steerable wheel assembly which has a spindle mounted to an upper and lower control arm through the use of upper and lower ball joints.

SUMMARY OF THE INVENTION

According to the invention, a kingpin assembly has an adjustable mechanism which adjusts the camber or castor of the wheel mounted thereto.

In one embodiment, the kingpin assembly has a knuckle support with a vertical aperture therethrough. The yoke portion of the spindle has an upper and lower arm with holes therethrough sized to receive the ends of the kingpin. The upper and lower arms of the yoke are spaced to receive the end of the knuckle support with the holes through the arms alignable with the hole through the knuckle support. A one-piece sleeve has a cylindrical shaped outer surface centered about a central axis which is sized to be fitted within the vertical aperture through the knuckle support. The one-piece sleeve has a top end and bottom end with an aperture angled with respect to the central axis. The aperture has openings at the top and bottom ends eccentrically displaced from the central axis.

The kingpin is sized to extend through the angled aperture. As the sleeve rotates about its central axis, the angled aperture guides the king pin to adjust its inclination to cause the spindle to change its camber.

BRIEF DESCRIPTION OF THE DRAWINGS

The invention will now be described with reference to the accompanying drawings in which:

FIG. 1 is a front elevational view of an embodiment of the invention.

FIG. 2 is a perspective view of sleeve shown in FIG. 1.

FIG. 3 is a front elevational cross-sectional view of the King pin assembly shown in FIG. 1 adjusted to a positive camber.

FIG. 4 is a similar view as shown in FIG. 3 with the spindle adjusted to a negative camber.

FIG. 5 is a top plan view of the sleeve shown in FIG. 2.

FIG. 6 is a fragmentary side elevational view taken along the lines 6—6 in FIG. 2.

DETAILED DESCRIPTION OF THE PRESENTLY PREFERRED EMBODIMENT

Referring to FIG. 1, a kingpin assembly 10 has an axle 12 having a knuckle support end 14 with an aperture 16 extending vertically through the knuckle support end 14. A cylindrical kingpin 18 extends through the aperture 16 and is received by holes 20 and 22 in upper arm 24 and lower arm 26 respectively of yoke 28 which is integral with spindle 30. Spindle 30 mounts a wheel 32.

A sleeve 34 is wrapped about kingpin 18 and fitted within aperture 16. Referring now to FIG. 2, the sleeve has an outer cylindrical surface 36. A cylindrical shaped aperture 38 angles through the sleeve 34 from the top end 40 to the bottom end 42. The aperture has a top opening 44 which is eccentrically displaced from the center axis 46 of the sleeve. The bottom opening 48 is eccentrically displaced in an opposing direction from axis 46. The axis 46 of sleeve 34 intersects with the angled axis 50 of aperture 38 at a midpoint 52 between the top end 40 and bottom end 42.

The bottom end 42 lies in a plane perpendicular to the axis 50 of the angled aperture 38 such that the end 42 is inclined with respect to a plane perpendicular to the center axis 46. In addition, the end 42 is circumscribed by a shoulder 54 which radially extends outwardly from the outer surface 36. The shoulder 54 has a planar section 56 which lies in a plane perpendicular to the axis 46 of sleeve 34.

In addition, two lateral grooves 58 are 180° offset from each other about the outer surface 36. Each groove 58 protrudes into the aperture 38 to define a slot 60 in communication with the groove. Each lateral groove 58 is substantially horizontal as shown in FIGS. 2 and 6, and is semicircular in cross-section.

An axially extending slot 62 extends from the top end 40 to the bottom end 42 and passes through the outer surface 36, shoulder 54, and to angled apertures 38. The slot 62 allows for larger manufacturing tolerances and makes minute adjustments possible to adjust the diameter of the sleeve 34.

As shown in FIG. 3, a kinpin 18 extends through angled aperture 38. The kingpin upper end 64 is received in hole 20 of upper arm 24 and its lower end 66 is received in hole 22 and lower arm 26. Kingpin 18 has one lateral groove 68 alignable with the respective slots 60 in sleeve 34. In addition, knuckle end 14 as shown in FIG. 1 has an aperture 70 which aligns with one of the grooves 58 in sleeve 34. A lug 72 passes through the opening created by the aperture 70, groove 58, slot 60, and groove 68 to nonrotatably and axially lock the kingpin sleeve and knuckle end together.

Bottom end 42 is parallel to an upper surface 74 of lower arms 26 with a set of thrust bearings 76 interposed between the inclined end 42 and surface 74.

The angled aperture 38 can have varying predetermined angles with respect to the central axis 46 of sleeve 34. The range can be anywhere from 0° to 2° or 3° depending upon the camber adjustment desired for the wheel 32. As shown in FIG. 3, the angled aperture will give a positive camber to the spindle 30 by having end 64 positioned laterally outwardly from end 66.

If a negative camber is desired, the kingpin 18 and sleeve 34 can be rotated 180° by removal of the lug 72, rotation of the sleeve so the opposing groove 58 on sleeve 34 is aligned with groove 68, and reinsertion of lug 72 into the aligned grooves 68 and 58. In this fashion, end 64 is laterally positioned inwardly from end 66 to adjust the spindle 30 to a negative camber. In spite of being rotated, the inclined end 42 remains parallel to the upper surface 74 of lower arm 26 to provide a flush fit for thrust bearing 76.

In this fashion, an adjustable kingpin assembly is provided with a sleeve that can adjust the spindle to a positive or negative camber.

Castor adjustments can be made with a slight variation in the construction of the knuckle support. The aperture 70 can be located transverse from its illustrated position to receive a laterally extending lug such that the two locked positions of the sleeve 34 will adjust the castor angle.

Variations and modifications of the invention can be made without departing from its spirit or scope as defined in the appended claims.

The embodiments of the invention in which an exclusive privilege is claimed are defined as follows:

1. An adjustable kingpin assembly comprising;
a yoke with a first and second arm spaced apart from each other, each arm having a hole therethrough;
a knuckle support operably attached to a supportive member of a vehicle;
said knuckle support sized to fit within the space between the two arms and having an aperture extending therethrough and aligned with said holes in the two arms;
a sleeve rotatably fitting within the aperture through the knuckle support;
said sleeve having an aperture extending therethrough from a top opening in the top end to a bottom opening in the bottom end of said sleeve;
said aperture through said sleeve being angled with respect to the axis of said aperture through said knuckle support;
a kingpin sized to extend through said angled aperture and having its ends rotatably received in said holes of said arms of said yoke for rotatably mounting said yoke to said knuckle support;
said sleeve rotatably mounted within said aperture of said knuckle support to angle said kingpin with respect to the normal axis of said aperture through said knuckle support, said kingpin assembly constructed to angle said yoke with respect to said knuckle support for adjusting said camber or castor;
locking means for locking said sleeve in said aperture of said knuckle support for fixedly mounting said yoke at a selected camber or castor with respect to said knuckle support;
said locking means comprising;
said knuckle support having a horizontal aperture therethrough forming a horizontal groove at a side of said vertical aperture through said knuckle support;
a plurality of horizontal grooves on the outer surface of said sleeve laterally displaced about the sleeve and alignable with said aperture in said knuckle support;
each groove intruding into the angled aperture through said sleeve to form a horizontal slot;
said kingpin having a horizontal groove alignable with one of said horizontal slots when said kingpin is received in said angled aperture;
a lug sized to extend through said horizontal aperture and fitting snugly within said aligned grooves and extending radially through said corresponding slot to fit within said groove in said kingpin to lock the kingpin, sleeve, and knuckle support fixedly together.

2. An adjustable kingpin assembly as defined in claim 1 wherein the top opening and bottom opening are oppositely eccentric with respect to the central axis of said aperture of said knuckle support.

3. An adjustable kingpin assembly as defined in claim 2 wherein the axis of said angled aperture intersects with said axis of said aperture through said knuckle support near the axial center of said sleeve between said top and bottom ends;
said yoke being adjustably angled about said point of intersection.

4. An adjustable kingpin assembly defined in claim 1 wherein said bottom end of said sleeve lies in a plane perpendicular to the axis of said angled aperture such that a top surface of said bottom arm of said yoke is substantially parallel to said end;
a bearing assembly is operably interposed between said bottom end and said top surface of said bottom arm of said yoke.

5. An adjustable kingpin assembly defined in claim 4 further comprising a bottom flange outwardly extending from said sleeve and forming a shoulder which seats said knuckle support thereon, said shoulder defined in a plane perpendicular to said central axis of said sleeve.

6. An adjusting kingpin assembly as defined in claim 5 wherein said locking means locks the rotatable sleeve in two 180° opposing positions to lock the kingpin assembly at one of two different and opposing camber angles.

7. An adjustable kingpin assembly comprising;
a yoke with a first and second arm spaced apart from each other, each arm having a hole therethrough;
a knuckle support operably attached to a supportive member of a vehicle;
said knuckle support sized to fit within the space between the two arms and having an aperture extending therethrough and aligned with said holes in the two arms;
a sleeve rotatably fitting within the aperture through the knuckle support;
said sleeve having an aperture extending therethrough from a top opening in the top end to a bottom opening in the bottom end of said sleeve;
said aperture through said sleeve being angled with respect to the axis of said aperture through said knuckle support;
a kingpin sized to extend through said angled aperture and having its ends rotatably received in said holes of said arms of said yoke for rotatably mounting said yoke to said knuckle support;
said sleeve rotatably mounted within said aperture of said knuckle support to angle said kingpin with respect to the normal axis of said aperture through said knuckle support, said kingpin assembly constructed to angle said yoke with respect to said knuckle support for adjusting said camber or castor;

locking means for locking said sleeve in said aperture of said knuckle support for fixedly mounting said yoke at a selected camber or castor with respect to said knuckle support;

said bottom end of said sleeve lying in a plane perpendicular to the axis of said angled aperture such that a top surface of said bottom arm of said yoke is substantially parallel to said end;

a bearing assembly operably interposed between said bottom end and said top surface of said bottom arm of said yoke.

8. An adjustable kingpin assembly defined in claim 7 further comprising a bottom flange outwardly extending from said sleeve and forming a shoulder which seats said knuckle support thereon, said shoulder defined in a plane perpendicular to the central axis of said sleeve.

9. An adjusting kingpin assembly as defined in claim 8 wherein said locking means locks the rotatable sleeve in two 180° opposing positions to lock the kingpin assembly at one of two opposing camber angles.

10. An adjustable kingpin assembly as defined in claim 1 or 7 wherein said aperture through said sleeve forms a cylindrical opening therethrough and said kingpin is substantially cylindrical in shape and extends through said cylindrical opening in said sleeve.

* * * * *